United States Patent [19]

Tsurita et al.

[11] Patent Number: 5,498,731
[45] Date of Patent: Mar. 12, 1996

[54] OXIDE CATALYST AND PROCESS FOR PRODUCING MALEIC ANHYDRIDE BY USING OXIDE CATALYST

[75] Inventors: Yasushi Tsurita, Kurashiki; Masumi Ito, Yokohama; Ken Shiraga, Yokkaichi, all of Japan

[73] Assignee: Mitsubishi Chemical Corporation, Tokyo, Japan

[21] Appl. No.: 266,510

[22] Filed: Jun. 27, 1994

[30] Foreign Application Priority Data

Jun. 29, 1993 [JP] Japan .................................. 5-158760

[51] Int. Cl.$^6$ ............................................... B01J 27/198
[52] U.S. Cl. ........................... 549/259; 549/260; 502/209
[58] Field of Search ............................ 502/209; 549/259, 549/260

[56] References Cited

U.S. PATENT DOCUMENTS

| | | | |
|---|---|---|---|
| 4,351,773 | 9/1982 | Milberger et al. | 549/259 |
| 4,472,527 | 9/1984 | Otake et al. | 502/209 |
| 4,510,258 | 4/1985 | Suciu et al. | 502/209 |

FOREIGN PATENT DOCUMENTS

| | | |
|---|---|---|
| 53-13607 | 5/1978 | Japan . |
| 57-122944 | 7/1982 | Japan . |
| 58-151312 | 9/1983 | Japan . |
| 59-55350 | 3/1984 | Japan . |
| 60-64632 | 4/1985 | Japan . |
| 1-50455 | 10/1989 | Japan . |
| 4-79699 | 12/1992 | Japan . |

*Primary Examiner*—Bernard Dentz
*Attorney, Agent, or Firm*—Oblon, Spivak, McClelland, Maier & Neustadt

[57] ABSTRACT

An oxide catalyst for producing maleic anhydride by vapor phase oxidation of a hydrocarbon having 4 carbon atoms, obtainable by (1) reacting a pentavalent vanadium compound and a pentavalent phosphorus compound in an organic solvent in the presence of a reducing agent capable of reducing the pentavalent vanadium to the tetravalent state to produce the crystalline composite oxide particles containing tetravalent vanadium and pentavalent phosphorus, (2) dry-pulverizing the obtained crystalline composite oxide particles in a high-speed gas flow, (3) mixing the pulverized particles with an aqueous solution containing tetravalent vanadium and pentavalent phosphorus to form a slurry, and (4) spray-drying the slurry and then calcining.

16 Claims, No Drawings

OXIDE CATALYST AND PROCESS FOR PRODUCING MALEIC ANHYDRIDE BY USING OXIDE CATALYST

BACKGROUND OF THE INVENTION

The present invention relates to an oxide catalyst, particularly an oxide catalyst suited for producing maleic anhydride by vapor phase oxidation of a hydrocarbon having 4 carbon atoms, such as butane, butene, butadiene or the like, and a process for producing maleic anhydride by vapor phase oxidation of a hydrocarbon having 4 carbon atoms in the presence of the oxide catalyst.

The catalysts comprising tetravalent vanadium and pentavalent phosphorus have been used for production of maleic anhydride by selective oxidation in vapor phase, a hydrocarbon having 4 carbon atoms such as butane, butene, butadiene or the like, especially n-butane which is a saturated hydrocarbon. Among these catalysts, vanadyl pyrophosphate $((VO)_2P_2O_7)$ is known as a crystalline composite oxide catalyst having excellent catalytic activities, and there are many literatures relating to this compound (e.g. Chem. Rev. 88. pp. 55–80, 1988, and references cited therein). For the synthesis of divanadyl pyrophosphate, a method comprising heating vanadyl hydrogen phosphate hemihydrate $(VOHPO_4.0.5H_2O)$ which is a precursor of the compound is generally employed, and it is reported that the precursor, when heated, can be converted into vanadyl pyrophosphate through topotactic transformation.

Many proposals have been made on the preparation of vanadyl hydrogen phosphate hemihydrate used as the precursor. Most of them employ the method for preparing the precursor in an organic solvent (see, for example, Japanese Patent Publication (KOKOKU) Nos. 53-13607 (1978) and 1-50455 (1989)). The method basically comprises reacting a pentavalent vanadium compound with a pentavalent phosphorus compound in a reducing organic solvent while reducing the vanadium compound with the solvent, to obtain a precursor of a crystalline composite oxide of tetravalent vanadium and pentavalent phosphorus.

Proposals have also been made regarding the preparation of a fluid-bed catalyst using vanadyl pyrophosphate precursor prepared in an organic solvent as mentioned above. When crystalline vanadyl pyrophosphate alone is made into a fluid catalyst, the catalyst obtained is very weak in mechanical strength of the catalyst and unusable under the industrial fluidized bed reaction conditions, so studies have been made on the preparation of practical fluid-bed catalysts.

Concerning preparation of a fluid-bed catalyst by use of vanadyl pyrophosphate or its precursor, Japanese Patent Application Laid-Open (KOKAI) No. 57-122944 (1982), for instance, discloses a process which comprises comminuting the catalyst precursor prepared in an organic liquid, introducing the precursor into water to form an aqueous slurry, and spray-drying the slurry. In this process, the catalyst precursor is comminuted so that the substantial portion thereof has an average particle size (diameter) of less than 1 micron, preferably less than 0.5 microns, and ball milling is mentioned as a means for comminuting. As to the catalyst composition, the catalyst precursor synthesized in an organic solvent alone and a mixture of the precursor with silica were actually used. Japanese Patent Application Laid-Open (KOKAI) No. 59-55350 (1984) discloses a process in which the catalyst precursor containing a mixed oxide of vanadium and phosphorus is densified and comminuted to form fluidisable particles and the particles are calcined under the fluidization conditions. In the Examples of these publications, there is shown a method in which the material is comminuted by a ball mill and formed into a water slurry, and the slurry is spray-dried with adding or without adding silica sol. In a Comparative Example, it is shown that when comminuting is carried out by an air mill, the obtained catalyst is low in mechanical strength.

Japanese Patent Application Laid-Open (KOKAI) No. 60-64632 (1985) discloses a process in which a crystalline composite oxide containing tetravalent vanadium with pentavalent phosphorus, obtained by reacting a pentavalent vanadium compound and a pentavalent phosphorus compound in an organic solvent capable of reducing the pentavalent vanadium to the tetravalent state, as the first component; an aqueous solution containing tetravalent vanadium and phosphorus, as the second component; and silica sol used as the third component are mixed to prepare a slurry and the resultant slurry is spray-dried. In the Examples of this publication, the three-component mixed slurry is subjected to wet pulverizing and mixing, then spray dried and calcined to form a fluidisable catalyst.

However, the catalyst obtained according to the conventional production process has not be able to satisfy all of the requirements for an industrial catalyst, as mentioned below.

(i) Excellent mechanical properties such as mechanical strength.

(ii) Excellent reaction performance.

(iii) Low cost and good production reproducibility.

So, improvements on these items have been required.

As a result of the studies by the present inventors, it has been found that an oxide catalyst obtained by the followings can well meet the requirements. First, the crystalline composite oxide particles containing tetravalent vanadium and pentavalent phosphorus are prepared by reaction of a pentavalent vanadium compound and a pentavalent phosphorus compound in an organic solvent in the presence of a reducing agent capable of reducing the pentavalent vanadium to the tetravalent state, then the crystalline composite oxide particles are dry-pulverized in a high-speed gas flow, the pulverized particles are mixed with an aqueous solution containing tetravalent vanadium and pentavalent phosphorus to form a slurry, and the slurry is spray-dried and then calcined. The present invention has been attained on the basis of this finding.

SUMMARY OF THE INVENTION

An object of the present invention is to provide an oxide catalyst which is suited for use in production of maleic anhydride by vapor phase oxidation of a hydrocarbon having 4 carbon atoms, such as butane, butene, butadiene or the like, and which is remarkably improved in mechanical strength and particle fluidity, shows excellent reaction performance in practical use and can be produced with good reproducibility and at low cost even under the industrial catalyst production conditions.

Another object of the present invention is to provide a process for producing maleic anhydride by vapor phase oxidation of a hydrocarbon having 4 carbon atoms, which is improved in yield of maleic anhydride by use of the oxide catalyst.

In the first aspect of the present invention, there is provided an oxide catalyst for producing maleic anhydride by vapor phase oxidation of a hydrocarbon having 4 carbon atoms, obtainable by (1) reacting a pentavalent vanadium compound and a pentavalent phosphorus compound in an organic solvent in the presence of a reducing agent capable of reducing the pentavalent vanadium to the tetravalent state to produce the crystalline composite oxide particles containing tetravalent vanadium and pentavalent phosphorus, (2) dry-pulverizing the obtained crystalline composite oxide particles in a high-speed gas flow, (3) mixing the pulverized particles with an aqueous solution containing tetravalent vanadium and pentavalent phosphorus to form a slurry, and (4) spray-drying the slurry and then calcining.

In the second aspect of the present invention, there is provided a process for producing maleic anhydride by vapor phase oxidation of a hydrocarbon having 4 carbon atoms in the presence of oxide catalyst obtainable by (1) reacting a pentavalent vanadium compound and a pentavalent phosphorus compound in an organic solvent in the presence of a reducing agent capable of reducing the pentavalent vanadium to the tetravalent state to produce the crystalline composite oxide particles containing tetravalent vanadium and pentavalent phosphorus, (2) dry-pulverizing the obtained crystalline composite oxide particles in a high-speed gas flow, (3) mixing the pulverized particles with an aqueous solution containing tetravalent vanadium and pentavalent phosphorus to form a slurry, and (4) spray-drying the slurry and then calcining.

DETAILED DESCRIPTION OF THE INVENTION

The oxide catalyst of the present invention can be prepared according to a process comprising the following steps (1)–(4):

(1) a pentavalent vanadium compound and a pentavalent phosphorus compound are reacted in an organic solvent in the presence of a reducing agent capable of reducing the pentavalent vanadium to the tetravalent state, thereby obtaining the crystalline composite oxide particles containing tetravalent vanadium and pentavalent phosphorus (The first step);

(2) the crystalline composite oxide particles obtained in the first step are dry-pulverized in a high-speed flow (The second step);

(3) the pulverized material obtained in the second step is mixed with an aqueous solution containing tetravalent vanadium and pentavalent phosphorus to form a slurry (The third step);

(4) the slurry obtained in the third step is spray-dried and calcined (The fourth step).

The above process is explained below as to each step.

In the first step, a typical method is that vanadium pentoxide as the pentavalent vanadium compound, and phosphoric acid as the pentavalent phosphorus compound, are heated in organic solvent(s) that has an ability to reduce the pentavalent vanadium. Generally, it is preferable that the reaction system is as much free from water as possible, so a suitable means for removal of water is preferably used in the course of heating. It is preferable to use anhydrous phosphoric acid with a purity of 98 to 100% which is commercially available as a colorless solid product. However, in the present invention, 85% phosphoric acid which is easily available on the industrial scale and inexpensive may be used as phosphoric acid.

In case of using a reducing organic solvent which is capable of reducing the pentavalent vanadium, the organic compound of the solvent itself also serves as a reducing agent in the reaction system. As the organic compound, there can be used, for example, those having a functional group susceptible to oxidation or those capable of forming a functional group susceptible to oxidation in the course of reaction (heating). Typically, the compounds having alcoholic hydroxyl group are preferred. Examples of the compounds are $C_{3-5}$ aliphatic alcohols such as 2-propanol and 2-methylpropanol, and aromatic alcohols such as benzyl alcohol. It is possible to use a mixture of the compounds as the organic solvent. For instance, 2-methylpropanol may be used in combination with benzyl alcohol which has high reducing action. Also, a reducing agent such as hydrazine or oxalic acid may be added to the organic solvent.

The above materials are mixed and heated usually to around the boiling point of the organic solvent, such as 50° to 200° C., to reduce the pentavalent vanadium to the tetravalent state and to carry out reaction with a phosphorus compound, thereby obtaining the crystalline composite oxide particles containing tetravalent vanadium and pentavalent phosphorus. The reaction may be started by introducing a phosphorus compound after reduction of vanadium has been advanced to a certain extent. Alternatively, a phosphorus compound may be introduced to the reaction system from the beginning of synthesis to carry out the reaction with the phosphorus compound accompanied with reduction. The ratio of the phosphorus compound to the vanadium compound is usually 1.0 to 1.3 in terms of P/V atomic ratio. The composite oxide particles thus obtained may not necessarily be completely crystalline. It is essential that the particles contain at least partly vanadyl hydrogen phosphate hemihydrate, usually in an amount of not less than 50 wt %. The particles obtained in the first step described above are separated by ordinary methods for solid/liquid separation and, if necessary, washed with a solvent such as alcohol, and then dried.

In the reaction (synthesis) in the first step, it is preferable for improving the characteristics of the obtained catalyst to add a compound of a metal such as iron, cobalt, zinc or the like in an amount of 0.005 to 0.2 moles as the ratio of the metal atoms to one mole of vanadium atoms, for the purpose of introducing a cocatalyst element, either from the beginning or in the course of the synthesis. The especially preferred compound to be added is an iron compound, specifically ferric chloride, ferric nitrate, ferric sulfate, ferric acetate, ferrous oxalate or the like.

In the second step, the particles obtained in the first step are dry-pulverized in a high-speed gas flow. The pulverizing of the particles is accomplished by impingement of the particles against each other or against the wall of the pulverizing apparatus in a high-speed gas flow. A high-speed gas flow can be easily formed by, for example, blowing a gas from a nozzle. As the gas, air or various types of inert gas such as helium, argon and nitrogen can be used, but use of air is preferable for economical reason. An example of the pulverizing apparatus is a jet mill known in the field of powder working (Handbook of Micromeritics, edited by Japan Micromeritics Association and published by Nikkan Kogyo Shimbunsha, 1st ed. Feb. 28, 1986). There are various types of jet mill such as (1) nozzle blow type (vertical type and horizontal type), (2) nozzle suction type, (3) impingement plate type, (4) jet stream impingement type, (5) fluidized bed type and (6) composite type. Examples of the pulverizing apparatus are jet ohmizer mill and single-track jet mill. According to the studies by the present inventors, it was found that the particles obtained in the first step can be relatively easily broken down into particles having a weight-average size of not more than 3 μm by dry pulverizing in a high-speed flow. The weight-average size means a diameter at the point of 50 wt % of the total accumulated value.

In the case of jet mill pulverizing, the gas pressure for the jet mill is changed depending on the preparation method in the first step, but is usually 2 to 12 KG (kgf/cm$^2$), preferably 3 to 10 KG, more preferably 3 to 8 KG. When the gas pressure is less than 2 KG, the obtained fluidisable catalyst may be unsatisfactory in mechanical strength, and when it exceeds 12 KG, a high-pressure equipment is required.

Dry pulverizing in a high-speed gas flow is considered favorable for catalyst performance because there is no possibility of contamination of the pulverized product with the pulverizing medium which is observed in ordinary dry pulverizing or wet pulverizing by a ball mill. Also, the pulverizing system has no necessity of separating the pulverized product from the pulverizing medium. Therefore, it can notably shorten operation time and is suited for continuous pulverizing. Degree of dryness of the pulverized particles is also improved with accomplishment of pulverizing in a high-speed gas flow.

According to dry pulverizing in a high-speed gas flow, as compared with ordinary dry pulverizing by a ball mill or the like, the particle size distribution is sharp because contamination of coarse particles is prevented. The particle size distribution depends on properties of particles obtained in the first step and the pulverizing conditions of the second step, but is sharp compared with the other dry-pulverizing methods such as ball-milling. The ratio of 25% diameter to 75% diameter, $d_{25}/d_{75}$ is usually not more than 6, preferably not more than 5, wherein $d_{25}$ is a diameter at the point of 25% of the total accumulated weight and $d_{75}$ is a particle diameter at the point of 75%, when the weights of the particles classified are accumulated in order of size. The obtained product has good reproducibility.

Comparison of powder X-ray diffraction patterns (source: CuKα-rays) before and after dry pulverizing in a high-speed flow shows a change of strength ratio of a peak at $2\theta=15.5°$ to one at $2\theta=30.4°$, with the peak at 15.5° being strengthened. The peak at 15.5° corresponds to the 001 plane (broad plane of plate crystal) of vanadyl hydrogen phosphate hemihydrate which is the catalyst precursor. This change of peak strength indicates break-up and transformation of the aggregated state of the catalyst precursor into the plate-like state. It is considered that such transformation of shape of the catalyst precursor is effective to the improvement of mechanical strength of the catalyst.

In the present invention, the particles obtained in the first step is dry-pulverized in the second step preferably without preliminarily calcining the particles obtained in the first step, that is, in 'the dry state'. The size of the particles obtained from dry-pulverizing in the second step depends on the properties of the particles produced in the first step and the pulverizing conditions in the second step, but is typically in the range of 0.3 to 5 μm, preferably 0.5 to 2.0 μm, in terms of weight-average particle diameter.

In the third step, the pulverized particles obtained in the second step are mixed with an aqueous solution containing tetravalent vanadium and pentavalent phosphorus to form an aqueous slurry. The preferred form of the aqueous solution containing substantially tetravalent vanadium and pentavalent phosphorus is a stabilized aqueous solution of vanadyl phosphate, and for instance the aqueous solution shown in Japanese Patent Application Laid-Open (KOKAI) No. 58-151312 (1983) can be used. This aqueous solution may be obtained by reacting the pentavalent vanadium compound such as vanadium pentoxide with a reducing agent such as hydrous hydrazine, phosphorous acid, oxalic acid, lactic acid or the like in the acidic aqueous solution of phosphoric acid to reduce pentavalent vanadium to tetravalent vanadium. The amounts of phosphoric acid and the vanadium compound used may not necessarily be those that can quantitatively form vanadyl phosphate. The atomic ratio of phosphorus to vanadium is usually selected from the range of 0.5 to 10. For stabilizing the vanadyl phosphate solution so that it can be kept in storage, it is preferable to add oxalic acid in an amount of usually about 1.2 to 0.2 moles to one mole of vanadium element.

Since the aqueous solution is stabilized, it can be previously prepared for industrial application, and therefore, it is preferable to add the pulverized particles obtained in the second step to this aqueous solution to form an aqueous slurry. The solid content in this aqueous slurry is preferably in the range of 10 to 50% in terms of weight basis of the oxide catalyst after calcination. When the concentration is below the range, the drying efficiency in the next step may lower, while when the concentration is over the range, the slurry viscosity may raise to make the slurry unsuited for spray drying.

In the fourth step, the aqueous slurry obtained in the third step is spray-dried to form the spherical solid particles suited for fluidized bed catalyst. Spray drying can be accomplished by using a rotary disc type or nozzle blow type dryer. It is preferable to form the solid particles of about 20 to 100 μm in average diameter. The drying temperature is usually 100° to 350° C., preferably 120° to 250° C.

The solid particles obtained by spray drying are then calcined to form the oxide particles having the catalyst composition. Usually, calcination is carried out in an atmosphere of nitrogen, rare gas, air or a mixture thereof, or air atmosphere containing an organic material such as butane, butene or the like, at 350° to 700° C. for 0.1 to 10 hours. Various types of calcining or firing furnace such as fluid furnace, kiln type furnace, continuous furnace, etc., can be used for carrying out the calcination.

In the present invention, tetravalent vanadium and pentavalent phosphorus in the aqueous slurry obtained in the third step become an amorphous vanadium/phosphorus oxide in the catalyst obtained by drying and calcining the slurry, and it is considered that the amorphous oxide serves as a binder component that develops the mechanical strength of the catalyst. Therefore, in order to maximize the binder effect, it is preferable to mix the pulverized particles obtained in the second step and the aqueous solution of vanadyl phosphate in the third step such that the proportion of the component A in the catalyst after calcination in the fourth step is 90 to 50% by weight, preferably 75 to 50% by weight, and the proportion of the component B is 10 to 50% by weight, preferably 25 to 50% by weight, when the amorphous oxide of tetravalent vanadium and pentavalent phosphorus is expressed as component B (corresponding to $(V_2O_4)(P_2O_5)$ and $P_2O_5$) and the dried pulverized particles obtained in the second step is expressed as component A (corresponding to $(VO)_2P_2O_7$).

Silica such as fumed silica or silica sol may be added to the aqueous slurry for the purpose of improving mechanical strength of the catalyst. When adding silica, its amount is not more than 10% by weight, preferably 1 to 5% by weight, in the catalyst after calcination. Silica may not necessarily be added in the present invention. Whether such silica is added or not should be decided by taking into consideration the fact that it may cause some adverse effects such as lowering of reaction selectivity of maleic anhydride, when silica is present in the catalyst.

Use of the above catalyst is effective for partial oxidation reaction of a hydrocarbon or carboxylic acid, particularly, the preparation of maleic anhydride by vapor phase oxidation of a hydrocarbon having 4 carbon atoms such as n-butane, 1-butene, 2-butene, 1,3-butadiene or the like. Especially, economically advantageous hydrocarbon material are n-butane and butene, and these substances can be easily obtained by separation from natural gas or from the naphtha cracking product. As for the type of the oxidation reaction, it may be either fluid bed type or fixed bed type, but the fluid bed type reaction is preferred. Also, since the oxide catalyst of the present invention is also excellent in mechanical strength, there can be favorably employed a transport bed system in which the catalyst is recycled between the reaction zone and the regeneration zone, such as disclosed in U.S. Pat. No. 4,668,822. Air or a gas containing molecular oxygen is usually used as an oxidizing agent. The reaction is carried out usually at 300° to 500° C., preferably at 350° to 450° C., under ordinary pressure or under pressure of 0.05 to 10 kg/cm$^2$G.

In the case of the fluidized bed or fixed bed reaction system the reaction is carried out under an atmosphere with a starting hydrocarbon concentration of usually 0.1 to 10 vol %, preferably 1 to 5 vol %, and an oxygen concentration of 10 to 30 vol %. In the case of the transport bed system, the reaction is carried out under an atmosphere with a starting hydrocarbon concentration of usually 1 to 50 vol %, preferably 2 to 12 vol %, and an oxygen concentration of 0 to 10 vol %. Reoxidation of the catalyst in the case of the transport bed system is conducted under an atmosphere with an oxygen concentration of 0 to 40 vol %, usually in air.

By spray-drying and calcining the slurry obtained by mixing the pulverized particles obtained by dry-pulverizing the crystalline composite oxide particles formed in a high-speed gas flow in the first step, with an aqueous solution containing tetravalent vanadium and phosphorus, the mechanical strength and fluidity of the particles are drastically improved, and further an oxide catalyst capable of providing excellent reaction performance can be produced at low cost with good reproducibility even under the industrial catalyst production conditions.

The advantage of the present invention, particularly improvement of mechanical strength of the catalyst, is considered attributable to the narrowed range of particle size distribution that can be obtained by dry-pulverizing in a high-speed flow in the second step as compared with ordinary dry-pulverizing by a ball mill or like means. It is also considered that the advantage of the present invention is also associated with the fact that tetravalent vanadium and pentavalent phosphorus in the aqueous slurry obtained in the third step becomes an amorphous vanadium/phosphorus oxide in the catalyst obtained by drying the slurry and calcining, and the amorphous oxide serves as a binder component that develops the mechanical strength of the catalyst. The binder effect provides quite remarkable improvements.

The oxide catalyst provided according to the present invention is excellent in mechanical strength and particle fluidity and gives excellent reaction performance for a long period in use of reaction for producing maleic anhydride from a hydrocarbon having 4 carbon atoms. Therefore, production of maleic anhydride per catalyst is increased while an amount of catalyst required for a unit amount of maleic anhydride is reduced. The oxide catalyst of the present invention is particularly suited to the fluidized bed reaction conditions, and when a saturated hydrocarbon, preferably n-butane is used as starting hydrocarbon, selectivity is especially high. In production on the industrial scale, improvement of selectivity has very great significance, even if a few percent.

EXAMPLES

The present invention is further illustrated with reference to the examples, comparative examples and reaction test examples. However, the examples given below are merely intended to be illustrative and not to be considered as limiting the scope of the invention. "%" is by weight, unless otherwise noted.

Example 1

3.0 liters of 2-methylpropanol, 348 g of vanadium pentoxide and 553 g of 85% phosphoric acid were supplied into and heated in a 10-liter vessel, to which a solution of 54 g of ferric chloride hexahydrate in 3.4 liters of 2-methylpropanol was added. The slurry thus formed was refluxed for 7 hours, then cooled and filtered, and the resultant product was washed with 2-methylpropanol and dried at 130° C.

The above product was pulverized to a weight-average particle size (diameter) of about 1 μm by a single-track type jet mill manufactured by Seishin Kigyo, at air pressure of 7 KG. The obtained particles are hereinafter called "jet mill pulverized particles α".

10.54 kg of 85% phosphoric acid and 10.743 g of oxalic acid dihydrate were added to 10 kg of desalted water and dissolved by heating to 80° C. with stirring. Then 7.75 kg of vanadium pentoxide was added piecemeal with care so as not to cause foaming, and the mixture was reacted at 95° to 100° C. for 2 hours. After cooling, water was added to the reaction solution to make the overall amount to 38.5 kg. The P/V atomic ratio in this solution was 1.08, and the solution contained 0.5 gram mol of oxalic acid per gram atom of vanadium.

To a solution composed of 448 g of the vanadyl phosphate/oxalic acid solution, 1,147 g of water and 174 g of colloidal silica (Cataloid S20L produced by Shokubai Kasei KK, silica content: 20.1 wt %), 565 g of the jet mill pulverized particles α were added to form a slurry (component A: 70%; component B: 25%; silica: 5%). The solid content in the slurry (as weight of catalyst oxide after calcination) was 30%. This slurry was spray-dried by a disc rotary type spray drier to form particles. 500 g of the particles thus obtained were calcined by a fluid furnace under nitrogen gas flow at 550° C. for 2 hours.

Strength of the catalyst thus obtained was evaluated in the following way. A determined amount of the fluid bed catalyst was placed in an apparatus in which, for evaluation of catalyst strength in a fluid state, the fluid bed catalyst was forced to impinge against a SUS metal plate by high-speed air, and the amount of the catalyst brought into a flask designed to collect the broken catalyst particles was measured. The ratio of the broken catalyst amount to the initially charged amount of catalyst was given as index of catalyst strength (%). Thus, the smaller the strength index, the higher is the catalyst strength. The results of measurements are shown in Table 1 along with apparent bulk density of the catalyst which was measured according to JIS K-2504.

Example 2

A fluid bed catalyst was produced by following the same procedure as in Example 1 except that the slurry was prepared from 548 g of vanadyl phosphate/oxalic acid solution, 1,220 g of water and 565 g of jet mill pulverized particles α. The catalyst composition of this example was 70% component A and 30% component B, with no silica contained. The strength index and apparent bulk density of the obtained catalyst are shown in Table 1.

Comparative Example 1

A fluid bed catalyst was produced in the same way as in Example 1 except that jet mill pulverizing was omitted. The strength index and apparent bulk density of the obtained catalyst are shown in Table 1. The catalyst strength index was high (40.9%) and the apparent bulk density was very low.

Comparative Example 2

The same procedure as in Example 1 was followed except that the slurry was prepared from 1,525 g of water and 808 g of jet mill pulverized particles α, without using the vanadyl phosphate/oxalic acid solution. The apparent bulk density of the obtained catalyst was low (0.64 g/ml).

Example 3

The same procedure as in Example 1 was followed except that the slurry was prepared from 755 g of the vanadyl phosphate/oxalic acid solution, 1,095 g of water and 485 g of jet mill pulverized particles α. The catalyst composition was 60% of component A and 40% of component B. The strength index and apparent bulk density of the obtained catalyst are shown in Table 1.

Example 4

A fluid bed catalyst was produced by following the same procedure as in Example 1 except that the catalyst precursor produced in an organic solvent was pulverized to a weight-average particle size (diameter) of about 1 μm under jet mill pressure of 3 KG. The pulverized particles were measured by a laser diffraction-scattering particle size distribution measuring machine (LA 700, manufactured by Horiba Seisakusho Ltd.) to determine $d_{25}/d_{75}$. The $d_{25}/d_{75}$ was 1.71. The strength index and apparent bulk density of the obtained catalyst are shown in Table 1.

Examples 5 and 6

Fluid bed catalysts were produced according to the same procedure as in Example 4 except that the catalyst compositions were as shown in Table 1. The strength index and apparent bulk density of the obtained catalysts are shown in Table 1.

Example 7

6.4 liters of 2-methylpropanol, 348 g of vanadium pentoxide and 451 g of 99% phosphoric acid were supplied into and heated in a 10-liter vessel, and the obtained slurry was refluxed for 7 hours. After cooling, the reaction solution was filtered and the resulting product was washed with ethanol and dried at 130° C.

This product was pulverized by a single-track jet mill manufactured by Seishin Kigyo using air with a pressure of 7 KG. The thus obtained particles are hereinafter called "jet mill pulverized particles β".

A slurry was formed from 548 g of a vanadyl phosphate/oxalic acid solution prepared as in Example 1, 1,220 g of water and 565 g of jet mill pulverized particles β. The solid content in the slurry (as weight of the catalyst oxide after calcination) was 30%. This slurry was spray-dried by a disc rotary type spray drier to produce the particles. 500 g of the obtained particles were calcined by a fluid furnace at 550° C. for 2 hours under nitrogen gas flow. The obtained catalyst had a composition of 70% component A and 30% component B. The strength index and apparent bulk density of this catalyst were as shown in Table 1.

Comparative Example 3

A catalyst was produced by following the procedure of Example 7 except that the slurry was prepared from 695 g of silica sol (silica content: 20.1 wt %), 120 g of water and 646 g of jet mill pulverized particles β, without adding a vanadyl phosphate/oxalic acid solution. The strength index and apparent bulk density of the obtained catalyst are shown in Table 1.

Comparative Example 4

A slurry was prepared from 565 g of a precursor prepared in an organic solvent in the same way as in Example 1, 548 g of a vanadyl phosphate/oxalic acid solution prepared in the same way as in Example 1, and 1,219 g of water. This slurry was pulverized by a Daino mill to a weight-average particle size of about 1 μm. The wet pulverized slurry was spray-dried by a disc rotary type spray drier to produce spherical particles and these particles were calcined by a fluid furnace at 550° C. for 2 hours under nitrogen gas flow. The obtained catalyst had a composition of 70% component A and 30% component B. The strength index and apparent bulk density of this catalyst are shown in Table 1.

Comparative Example 5

A fluid bed catalyst was produced in the same way as in Example 2 except that ordinary dry pulverizing by a ball mill was conducted instead of pulverizing by a jet mill. Dry pulverizing was performed by supplying 40 g of the prepared catalyst precursor into a 500 ml polyethylene vessel along with 625 g of 5-mm diameter balls and conducting pulverizing at 100 r.p.m. for 14 hours. The $d_{25}/d_{75}$ of the pulverized particles was 7.56. The catalyst composition was 70% component A and 30% component B. The strength index and apparent bulk density of the obtained catalyst are shown in Table 1.

TABLE 1

|  | Catalyst composition (wt %) | | | Strength index (%) | Apparent bulk density (g/mL) |
|---|---|---|---|---|---|
|  | Component A | Component B | Silica | | |
| Example 1 | 70 | 25 | 5 | 7.4 | 0.86 |
| Example 2 | 70 | 30 | 0 | 0.9 | 0.93 |
| Example 3 | 60 | 40 | 0 | 3.1 | 0.91 |
| Example 4 | 70 | 25 | 5 | 6.0 | 0.89 |
| Example 5 | 70 | 30 | 0 | 4.6 | 0.91 |
| Example 6 | 70 | 20 | 10 | 8.0 | 0.84 |
| Example 7 | 70 | 30 | 0 | 0.5 | 0.93 |
| Comp. Example 1 | 70 | 30 | 0 | 40.9 | 0.58 |
| Comp. Example 2 | 100 | 0 | 0 | Not measured | 0.64 |
| Comp. Example 3 | 80 | 0 | 20 | 22.5 | 0.72 |
| Comp. Example 4 | 70 | 30 | 0 | 1.2 | 0.91 |
| Comp. Example 5 | 70 | 30 | 0 | 27.7 | 0.84 |

Reaction Example 1

Each catalytic activity of the catalysts obtained in Example 2, Example 5, Comparative Example 4 and Comparative Example 5 was tested. 1 ml of each test catalyst was packed in a quartz-made reaction tube and an air-mixed gas having a n-butane concentration of 4 mol % was passed through the catalyst at a rate of 1,000 (GHSV) to carry out a reaction. After a predetermined period of time, the reaction tube outlet gas was sampled and analyzed by an on-line connected gas chromatograph. The results are shown in Table 2. The catalysts of Examples 2 and 5, as compared with the catalysts of Comparative Examples 4 and 5, provide a higher yield of maleic anhydride even at lower reaction temperatures and thus give better reaction performance. The catalyst of Comparative Example 5, as seen from Table 1, is high in strength index, that is, poor in catalyst strength, therefore unsuited for use as a fluid bed catalyst.

TABLE 2

| Catalyst used | Elapsed reaction time (hr) | Optimal reaction temp. (°C.) | Yield of maleic anhydride (%) |
| --- | --- | --- | --- |
| Catalyst of Example 2 | 150 | 395 | 52.5 |
|  | 500 | 409 | 53.6 |
| Catalyst of Example 5 | 150 | 406 | 51.0 |
|  | 500 | 414 | 53.2 |
| Catalyst of Comp. Example 4 | 150 | 394 | 47.2 |
|  | 500 | 410 | 50.7 |
| Catalyst of Comp. Example 5 | 150 | 412 | 49.6 |
|  | 500 | 420 | 50.6 |

What is claimed is:

1. An oxide catalyst for producing maleic anhydride by vapor phase oxidation of a hydrocarbon having 4 carbon atoms, obtainable by (1) reacting a pentavalent vanadium compound and a pentavalent phosphorus compound in an organic solvent in the presence of a reducing agent capable of reducing the pentavalent vanadium to the tetravalent state to produce the crystalline composite oxide particles containing tetravalent vanadium and pentavalent phosphorus, (2) dry-pulverizing the obtained crystalline composite oxide particles in a high-speed gas flow, (3) mixing the pulverized particles with an aqueous solution containing tetravalent vanadium and pentavalent phosphorus to form a slurry, and (4) spray-drying the slurry and then calcining.

2. An oxide catalyst according to claim 1, further containing at least one element selected from the group consisting of iron, cobalt and zinc, as cocatalyst element.

3. An oxide catalyst according to claim 1, wherein the aqueous solution containing tetravalent vanadium and pentavalent phosphorus is a vanadyl phosphate solution.

4. An oxide catalyst according to claim 1, wherein dry-pulverizing in a high-speed flow is carried out by a jet mill using a gas supplied with a pressure of 2 to 12 KG.

5. An oxide catalyst according to claim 1, wherein dry-pulverizing in a high-speed gas flow is carried out so that the weight-average particle diameter becomes in the range of 0.3 to 5 μm.

6. An oxide catalyst according to claim 1, wherein a solid content in the slurry is 10 to 50% in terms of weight of the oxide catalyst after calcination.

7. An oxide catalyst according to claim 1, containing the crystalline composite oxide particles in an amount of 50 to 90% in terms of weight of the oxide catalyst after calcination.

8. An oxide catalyst according to claim 1, wherein the hydrocarbon having 4 carbon atoms is n-butane.

9. A process for producing maleic anhydride by vapor phase oxidation of a hydrocarbon having 4 carbon atoms in the presence of an oxide catalyst obtainable by (1) reacting a pentavalent vanadium compound and a pentavalent phosphorus compound in an organic solvent in the presence of a reducing agent capable of reducing the pentavalent vanadium to the tetravalent state to produce the crystalline composite oxide particles containing tetravalent vanadium and pentavalent phosphorus, (2) dry-pulverizing the obtained crystalline composite oxide particles in a high-speed gas flow, (3) mixing the pulverized particles with an aqueous solution containing tetravalent vanadium and pentavalent phosphorus to form a slurry, and (4) spray-drying the slurry and then calcining.

10. A process according to claim 9, wherein the oxide catalyst contains at least one element selected from the group consisting of iron, cobalt and zinc, as cocatalyst element.

11. A process according to claim 9, wherein the aqueous solution containing tetravalent vanadium and pentavalent phosphorus is a vanadyl phosphate solution.

12. A process according to claim 9, wherein dry-pulverizing in a high-speed flow is carried out by a jet mill using a gas supplied with a pressure of 2 to 12 KG.

13. A process according to claim 9, wherein dry-pulverizing in a high-speed gas flow is carried out so that the weight-average particle diameter will become 0.3 to 5 μm.

14. A process according to claim 9, wherein a solid content in the slurry is 10 to 50% in terms of weight of the oxide catalyst after calcination.

15. A process according to claim 9, wherein the oxide catalyst contains the crystalline composite oxide particles in an amount of 50 to 90% in terms of weight of the oxide catalyst after calcination.

16. A process according to claim 9, wherein the hydrocarbon having 4 carbon atoms is n-butane.

* * * * *